Patented June 16, 1931

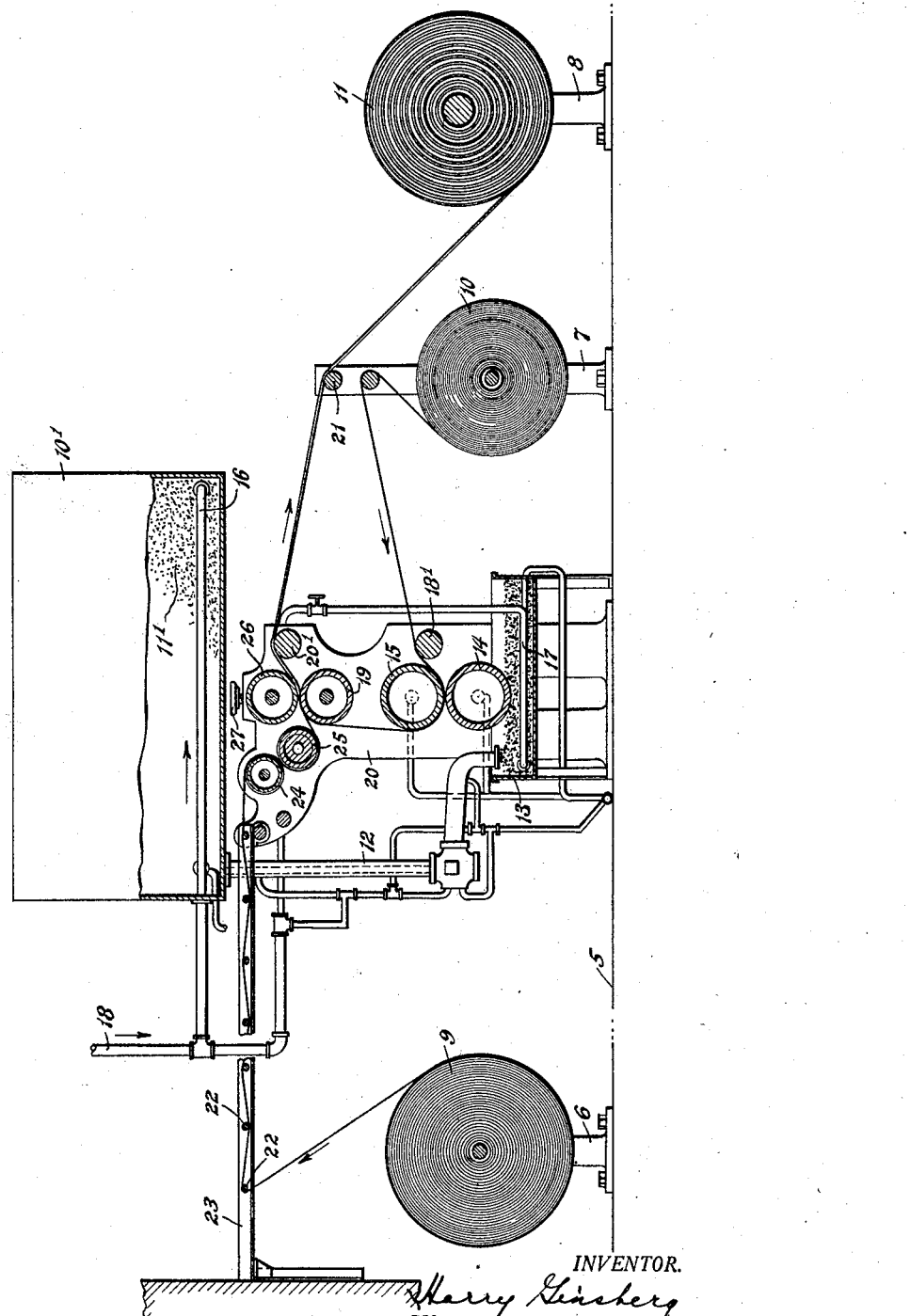

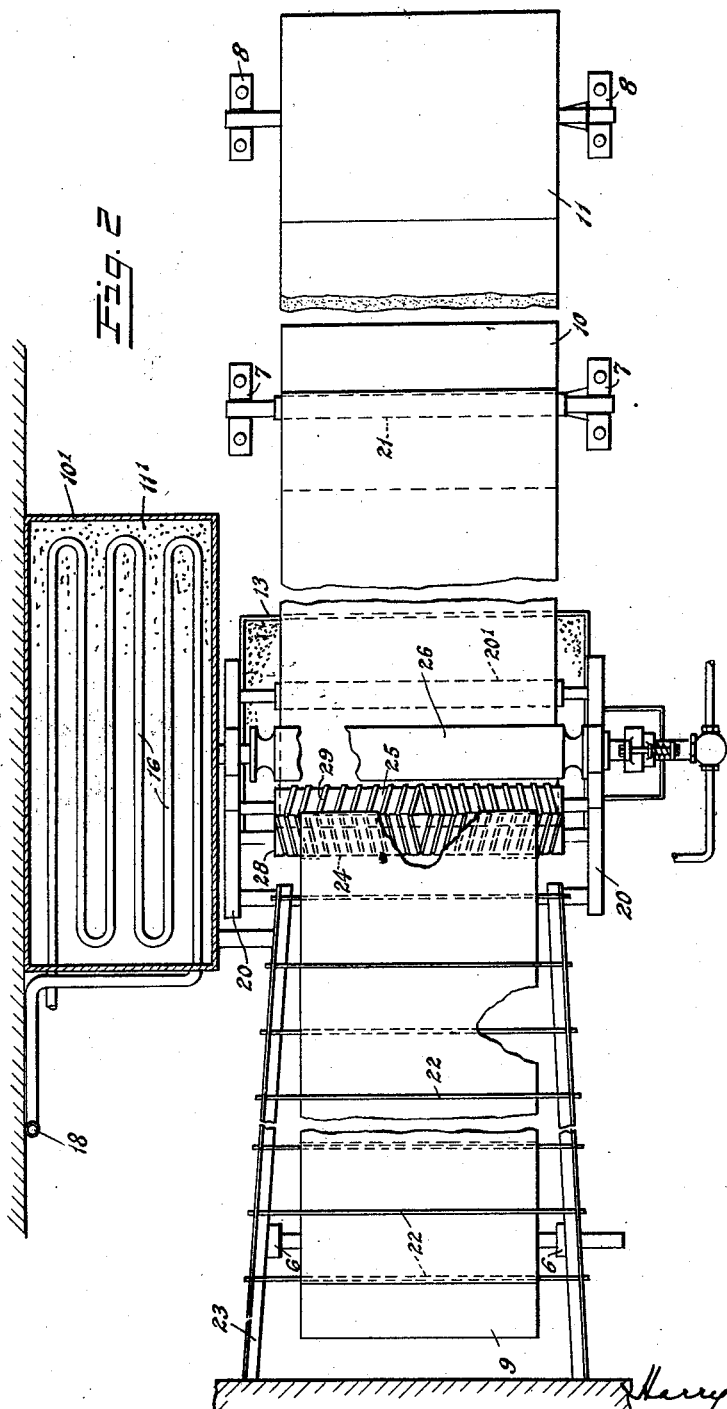

1,810,561

UNITED STATES PATENT OFFICE

HARRY GINSBERG, OF NEW YORK, N. Y., ASSIGNOR, BY MESNE ASSIGNMENTS, TO NATIONAL CONTAINER CORPORATION, OF LONG ISLAND CITY, NEW YORK, A CORPORATION OF NEW YORK

COMPOSITE SHEET FORMING MACHINE

Application filed July 22, 1927. Serial No. 207,615.

This invention relates to a structurally and functionally improved composite sheet-forming machine, and by means of which a superior composite article may be produced commercially.

It is an object of the invention to provide a device of this character, the parts of which will be few in number and individually rugged and simple in construction, and capable of being assembled at relatively nominal cost to provide a machine operating over long periods of time with freedom from mechanical difficulty and requiring a minimum of manual attention during its operation.

A further object of the invention is that of constructing a device of this type by means of which a plurality of layers of material may be joined to each other with facility and with a minimum of wastage in the finished article.

Another object is that of providing a sheet-forming machine by means of which the several layers embraced in the composite article or sheet will each be evenly disposed in proper relationship with respect to other layers and firmly secured thereto.

A still further object of the invention is that of furnishing such a machine in which a composite sheet will be produced, and specifically a sheet comprising a layer of impervious or imperforate material, such as, for example, paper, a layer of textile or other suitable material which is preferably woven, such as, for example, burlap, and an intermediate moisture-proof layer securing the exterior layers to each other, this intermediate layer being, for example, pitch.

With these and further objects in mind, the invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of which will be indicated in the claims.

For a fuller understanding of the nature and objects of the invention reference should be had to the following detailed description taken in connection with the accompanying drawings, in which:

Figure 1 is a partly sectional side elevation of a machine embodying one form of the present invention; and Fig. 2 is a partly sectional plan view thereof, certain portions being broken away to disclose underlying construction.

In these views the numeral 5 indicates a base upon which standards 6, 7 and 8 are mounted, these standards serving rotatably to support rolls respectively of burlap 9, paper 10, and the product 11. It is here to be understood that by means of the present machine a composite article is produced embodying, as before stated, paper, pitch and burlap, and for this reason it will be appreciated that hereinafter these layers will be referred to accordingly. However, it will likewise be appreciated that additional layers of material might be embodied in the composite article with but slight modification of the structure of the present machine, or that layers of different material might be substituted for those specified without in the slightest departing from the spirit and scope of the present invention.

Thus, in the present machine the paper extending from the roll is coated with pitch and the burlap is caused to adhere to the paper by means of this coating. To accomplish this result a tank 10' is employed which is preferably elevated and acts as a reservoir, containing a supply of pitch, tar or other suitable material 11'. Leading from this tank is a conduit 12, having its lower ends charging into a trough 13, within which a drum 14 is rotatably mounted. Positioned to rotate above the drum 14 is a second drum 15, and at this time it will be observed that with a view to rendering the mass of pitch fluid, coils of pipe 16 are provided within the tank 10', that the conduit 12 is jacketed (as in dotted lines), and that a further coil of pipe 17 is provided within and adjacent the trough 13. These coils of pipe and the jacketed portion of the conduit 12, as well as the interiors of the drums 14 and 15, are connected by means of an intake manifold 18 to a suitable source of steam supply (not shown). Accordingly, it will be apparent that with steam flowing through these several passages the pitch will be rendered fluid rapidly, and will be maintained in such condition so that it will flow freely through the several passages into the trough, and be picked up by the surface of the drum 14, as the latter is rotated; it being understood that suitable drives are provided for these drums, as well as the rollers, etc., hereinafter referred to.

The end of the paper extending from the roll 10 is preferably passed over a guiding and tensioning roller 18', arranged in advance of the drums 14 and 15, and this paper passes from the latter drum and in contact with the surface of the former upwardly to a roller 19 supported by the frame 20 of the machine, it being obvious that as the paper passes between the drums it will receive upon its outer face a layer of pitch. From the roller 19 the paper passes to a guiding roller 20', and thence over a further guiding roller 21 to the roll 11.

The free end of the roll of burlap passes alternately over and under adjacent horizontally extending bars 22 mounted by a frame 23, and thence over the peripheral areas a pair of rollers 24 and 25, and over the roller 19, with which it is pressed into contact by means of a roll 26, the position of the latter being adjustable, for example, by handwheels 27, the rollers 19—26 providing a uniting structure.

Referring to the construction of the rollers 24 and 25, it will be seen, reference being had to Fig. 2, that the first roller includes a body which may be metallic and which is formed with a spiral groove 28 arranged in two sections, each extending to the center of the roller, and these sections having their convolutions opposed. Furthermore, it will be observed that the roller 25, which may be of wood, mounts upon its outer face a spirally extending strip 29, for example, of rubber, this strip being also divided into two sections which are opposed to each other.

In an attempt heretofore made to produce a composite sheet embracing a woven material and suitable backing therefor, considerable difficulty has been experienced incident to unevenness of the finished article and the manner in which the fabric has been disposed in relation to the other layers of such article. More particularly, despite precautions, the strip of fabric has alternately extended beyond the opposite side edges of the backing sheet or sheets so that with the sheet strip of a width equal to the fabric strip, it has been necessary to trim back to a considerable extent both edges of the composite article in order to assure that all portions of this article would embody full layers of material.

However, by means of the present invention, the fabric which has been furnished as a roll 9 will, in its passage towards the rollers, pass over the rack provided by the bars 22 and the frame members 23, resulting in a straightening of the longitudinal strands of the fabric, and furthermore causing the tendency of the fabric to curl (for instance, incident to its having been shipped in roll form). In its passage over the rolls 24 and 25, the transverse fibers of the fabric will be acted upon to spread and arrange the longitudinally extending fibers of the fabric and to stretch the transversely extending fibers thereof. As a consequence, the fabric passes from between these rolls with practically all of its strands extending at right angles to each other, with no tendency of the fabric strip to curl, and with the side edges of this strip extending in practically perfect parallelism with respect to each other.

Thus, it will be found that by employing a paper strip having a width equal to that of the fabric strip, the edges of these two strips will register with no tendency of the former to weave alternately beyond opposite side edges of the latter strip and with these strips in intimate contact, the maintenance of which is assured by the layer of pitch, which serves the double purpose of providing a means for anchoring the two strips to each other, as well as embodying water-proofing qualities in the resultant article.

Thus, among others, the objects of the invention have been accomplished, and since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A sheet-forming machine, including means for uniting two strips of material, one of which comprises a fabric having longitudinally and transversely extending strands, and a pair of rollers arranged in advance of said uniting means and over the opposed peripheral areas of which said last-named strip passes in its travel towards said means, each of said rollers engaging and acting upon said strip to transversely stretch the same in its passage towards said uniting means, said rollers being arranged so that said strip traverses a substantial portion of the periphery of one of said rollers before it reaches the other and so that said strip traverses a substantial portion of the periphery of said other roller after it leaves the first roller.

2. A sheet-forming machine including means for uniting strips of material, one of which comprises a fabric strip having longitudinally and transversely extending strands, a pair of cylinders arranged in advance of said uniting means and each having a surface adapted to exert a spreading action on said fabric strip, said cylinders being arranged so that said fabric strip will be engaged by a substantial portion of the periphery of one of said cylinders before it is engaged by the other of said cylinders and will be engaged by a substantial portion of the periphery of said other of said cylinders after it has moved out of contact with the first cylinder, and a plurality of bars spaced in the direction of movement of said fabric prior to its contact with said first cylinder and adapted to act on a fabric woven through them to straighten the longitudinal strands of the fabric as the fabric moves past them and to reduce any tendency of the fabric to curl.

In testimony whereof I affix my signature.

HARRY GINSBERG.